T. Molinier.
Decanting Liquids.
N° 95,924.   Patented Oct. 19, 1869.

Witnesses:   Inventor:

United States Patent Office.

TITUS MOLINIER, OF NEW ORLEANS, LOUISIANA.

Letters Patent No. 95,924, dated October 19, 1869.

IMPROVEMENT IN APPARATUS FOR DECANTING LIQUIDS.

The Schedule referred to in these Letters Patent and making part of the same.

*To whom it may concern:*

Be it known that I, TITUS MOLINIER, of New Orleans, in the parish of Orleans, and State of Louisiana, have invented certain new and useful Improvements in Apparatus for Decanting or Pouring off Liquids; and I hereby declare the following to be a full, clear, and exact description of the same, reference being had to the accompanying drawings, in which—

The apparatus in which my invention consists is composed of a jointed or hinged tube or conduit, arranged so that its lower end, through which the liquid runs out, passes out at or near the bottom of the vessel to be emptied, while its upper or hinged portion is capable of being raised or depressed at will, so as to take off the liquid from the top in a greater or less quantity, as desired. With this tube or conduit I combine a handle, by means of which it can be elevated or lowered, a funnel-shaped receiving-end, to receive the liquid, and a hinged float, to surround the mouth of the funnel, and prevent the entrance therein of the scum, and other floating impurities on the top of the liquid.

The apparatus is characterized by the following advantages:

First, the top layers of the liquid, which are the purest, are those which are drawn off.

Second, the decantation can be arrested or resumed instantaneously, by a slight movement, forward or backward, of the tube or conduit, by means of its operating-handle, without necessitating the employment of other and accessory devices, to open and close the conduit.

Third, the absence of any stir produced in the purging, during the decantation, whether the vessel be emptied at once, or by successive draughts.

Fourth, the hinged float adapts itself to the position of the receiving-funnel, whether the latter be more or less sunk in the liquid, and, under all circumstances, prevents the entrance of the floating scum.

Fifth, the broad-mouthed funnel draws off the liquid gently and without disturbance, while, at the same time, it receives the liquid in large quantity, and empties the vessel rapidly.

The nature of my invention will be fully understood by reference to the accompanying drawings.

The decanting-conduit or tube, in this instance, is composed of the two sections *a a*, the contiguous ends of which are cut on a bevel, at an angle of about forty-five degrees.

The acute-angle ends of these bevelled faces are united by a hinge-joint, *b*, and the parts taken or cut off from the two sections are replaced by India rubber, leather, or any other suitable material, *c*, which renders the two sections in effect a continuous tube, with a flexible joint, so that the free end of the tube can be swung up or down, through an angle of forty-five degrees.

Figure 1:
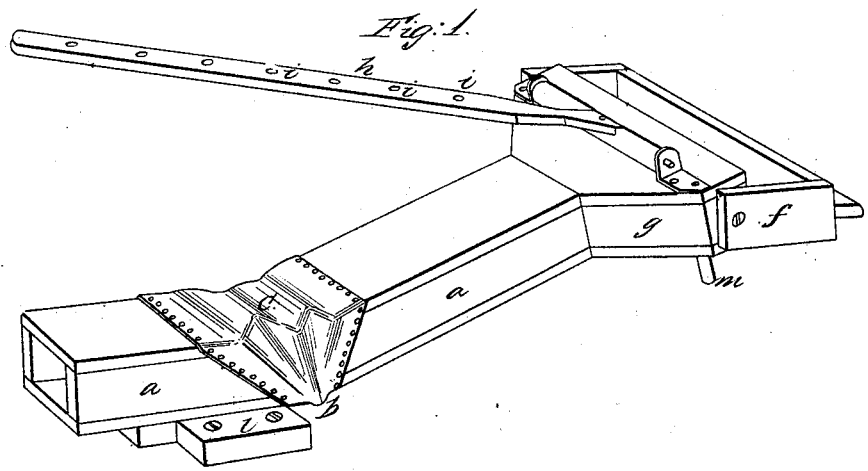
Figure 1 is a perspective view of an apparatus embodying my improvement.
Figure 2:
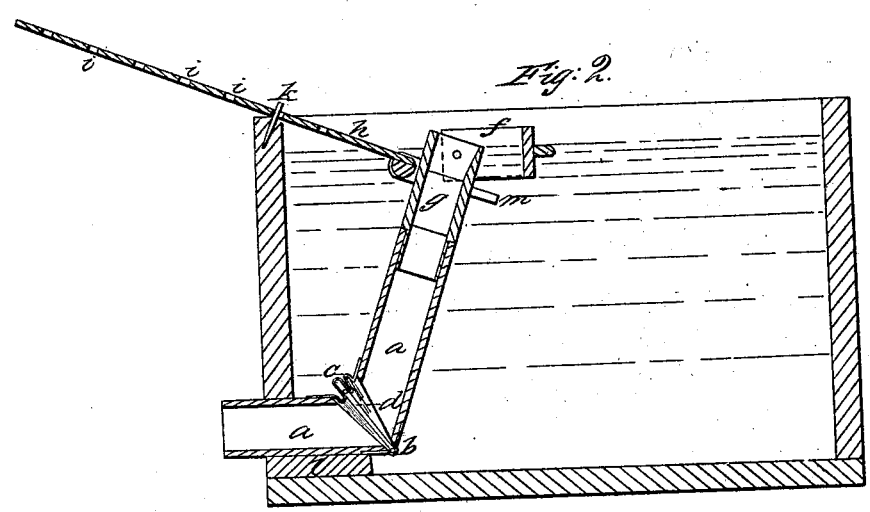
Figure 2 is a longitudinal central section of the same, representing the manner in which it is applied to the vessel from which the liquid is to be decanted.

In order to prevent the pliable or flexible material *c* from dropping down between the two jointed sections, when the upper part of the apparatus is elevated, thus impeding the passage of the liquid, I arrange just under it one or more yokes or props, *d*, of metal, or suitable material which can best be pivoted, or otherwise suitable mounted on the pin of the hinge-joint *b*, and serve to keep the material *c* out of the way, and the passage open, when the tube is raised, as shown in fig. 2.

To the upper extremity, and upon the prolongation of the tube or conduit, is fixed a broad and flat-mouthed funnel, *g*, through which the liquid flows into the conduit. By the use of a funnel of substantially this form, the liquid can be drawn off in large quantity, but at the same time gently, and without disturbance, passing in a broad, shallow stream or sheet over the lower edge of the funnel-mouth, and thence down through the conduit.

To the top of the funnel is hinged a float, *f*, which surrounds the mouth of the funnel, and works freely upon its joint, so as to adapt itself to the position of the tube, whether the same be more or less sunk in the liquid. Its weight is such as to immerse it partly in the liquid, its edges, however, remaining at all times at a suitable height above the level of the liquid, so as to keep back the floating scum, and prevent it from entering the funnel.

To the back of the funnel is hinged a handle, *h*, by which the tube is operated. By its use, the funnel can be forced down, so as to receive a greater or less quantity of liquid at one time, and the decantation can be instantaneously arrested, by drawing back the handle until the mouth of the funnel is above the level of the liquid, in which position it is sustained by fitting one of the series of holes *i*, in the handle, over a pin, *k*, fixed in the top of the vessel, as seen in fig. 2.

The apparatus is to be fixed within the vessel in which it is used, in the manner shown in the drawing. The lower or stationary end of the conduit opens out from the vessel near its bottom, and is fixed in position by means of its base-plate *l*, which is screwed, or otherwise fastened to the bottom of the vessel.

The plate *l* should be of suitable thickness to raise the tubes above the sediment or lees deposited in the vessel, and under the funnel are placed one or more feet, *m*, for the same purpose; but the latter are also slightly higher than the plate *l*, so that when the upper part of the tube is lowered to its full extent, the funnel-mouth may still be raised slightly higher than the discharge-end.

The operation of the apparatus is as follows:

The funnel is, by means of the handle, raised until it has attained a vertical, or nearly vertical position, in which position it is held by putting the peg *k* in one of the holes in the handle.

The vessel is then ready to receive the liquid, which is poured in, and after having made its deposit, either by natural causes, or by the action of chemical agents, is then in condition to be decanted. When the time arrives for this, the handle is disengaged and pushed forward gradually, until the mouth of the funnel is sunk the desired depth in the liquid, taking care to always maintain the back part of the mouth above the level of the liquid.

While the float keeps back the scum, the upper layers of the liquid will successively flow into the funnel, and down through the conduit, and so on, until the lowest layers of the liquid are reached. The scum then unites with the sediment in the bottom of the vessel, the decantation is accomplished, and the funnel is raised.

The conduit can be made of any suitable material, shape, and dimensions, and it may consist of several tubes, having an adjustable connection, for the purpose stated. To this end, two or more sections of metal tubing may be employed, said sections being connected by a ball-and-socket or other hinge joint, as will be understood without further explanation.

Having now described my invention, and the manner in which the same is or may be carried into effect, What I claim, and desire to secure by Letters Patent, is—

1. The combination, with the divided and hinged decanting-tube or conduit, of the funnel, fixed to the free end of said tube, and arranged to receive the liquid and conduct it to the tube, substantially as and for the purposes set forth.

2. The combination, with the decanting-tube or conduit, of a handle, connected with the free end of said conduit, and adapted to effect the elevation or depression of the receiving-funnel or orifice, and to hold it at any desired height, substantially as set forth.

3. The combination of the hinged conduit, the receiving-funnel or orifice, the handle, for elevating and depressing the same, and the hinged float, surrounding the mouth of said funnel, substantially as set forth.

4. The arrangement, at the point where the two sections of the conduit are hinged together, of leather, India rubber, or other suitable pliable material, which will unite the two sections in one continuous tube, and yet allow the upper or movable section to be swung up or down on its hinge, as set forth.

5. The combination, substantially as described, with the flexible or pliable material, connecting the two sections of the conduit, of props or supports, arranged within the conduit, so as to sustain the said pliable material, and prevent it from impeding the passage of the liquid through the conduit, when the upper section is elevated.

In testimony whereof, I have signed my name to this specification, before two subscribing witnesses.

T. MOLINIER.

Witnesses:
   EDN. THORPH,
   EDMOND SOUSHON.